(12) United States Patent
Lee et al.

(10) Patent No.: US 8,088,437 B2
(45) Date of Patent: Jan. 3, 2012

(54) METHOD FOR PRODUCTION OF SILVER-CONTAINING NANO-STRUCTURE, AND SILVER-CONTAINING NANO-STRUCTURE

(75) Inventors: SeungTaeg Lee, Sakura (JP); Ren-hua Jin, Tokyo (JP); Rika Kimura, Ichihara (JP); Zhiqiang Shi, Shandong (CN); Haifeng Zhao, Shandong (CN)

(73) Assignee: DIC Corporation, Tokyo (JP)

( * ) Notice: Subject to any disclaimer, the term of this patent is extended or adjusted under 35 U.S.C. 154(b) by 142 days.

(21) Appl. No.: 12/451,378

(22) PCT Filed: May 13, 2008

(86) PCT No.: PCT/JP2008/058775
§ 371 (c)(1),
(2), (4) Date: Nov. 10, 2009

(87) PCT Pub. No.: WO2008/143061
PCT Pub. Date: Nov. 27, 2008

(65) Prior Publication Data
US 2010/0120960 A1   May 13, 2010

(30) Foreign Application Priority Data
May 16, 2007   (JP) .................................. 2007-130375

(51) Int. Cl.
*B05D 7/14* (2006.01)
(52) U.S. Cl. .......................... 427/221; 524/403; 524/439
(58) Field of Classification Search .................. 427/216, 427/221; 524/403, 439
See application file for complete search history.

(56) References Cited

U.S. PATENT DOCUMENTS

2004/0234604 A1 * 11/2004 Mecking et al. .............. 424/486

FOREIGN PATENT DOCUMENTS

| JP | 08-027307 A | 1/1996 |
| JP | 09-111317 A | 4/1997 |
| JP | 2005-220380 A | 8/2005 |
| JP | 2006-213887 A | 8/2006 |
| WO | WO-2006/082996 A1 | 8/2006 |

OTHER PUBLICATIONS

International Search Report dated Aug. 19, 2008, issued on PCT/JP2008/058775.

* cited by examiner

*Primary Examiner* — Peter Szekely
(74) *Attorney, Agent, or Firm* — Edwards Wildman Palmer LLP; James E. Armstrong, IV; Junko Harada (57) ABSTRACT

Disclosed is a method for producing a silver-containing nanostructure which can reduce the time required for a post treatment step and the amount of a waste material and which is achieved by the application of the reduction reaction of silver oxide; and a silver-containing nanostructure having a specific structure, which can be produced by the method. Specifically disclosed is a method for producing a silver-containing nanostructure, including dispersing a polymeric compound in which a hydrophilic segment is bonded to a polyalkyleneimine chain in a medium, adding silver oxide thereto, and carrying out a reduction reaction of the silver oxide, thereby obtaining a silver-containing nanostructure. In the method, a structure having a branched structure can be produced when a specific compound is used as a complexing agent. The silver-containing nanostructure thus produced can be used as a conductive paste or the like.

12 Claims, 3 Drawing Sheets

METHOD FOR PRODUCTION OF SILVER-CONTAINING NANO-STRUCTURE, AND SILVER-CONTAINING NANO-STRUCTURE

TECHNICAL FIELD

The present invention relates to a structure containing silver and having a size on the order of nanometers. More specifically, the present invention relates to a method for producing a silver-containing nanostructure, the method which uses the reduction reaction of silver oxide and which makes the post treatment step easy, and thus is highly practicable industrially; and also relates to a silver-containing nanostructure having a specific structure and which can be obtained by the above method.

BACKGROUND ART

So-called metal nanoparticles that are formed by pulverizing metals such as silver down to a nanosize level (i.e., 1 to a few hundred nanometers in size) have considerably large specific surface areas. Accordingly, they have been attracting attention as functional materials which can possibly be used in various fields of applications, such as catalysts, electronic materials, magnetic materials, optical materials, various sensors, color materials, and medical testing applications. However, when the size of a metal is reduced down to a nanosize level, the surface energy of metal nanoparticles increases which causes a lowering of melting point at the particle surfaces. As a result, the metal nanoparticles readily fuse with each other and the storage stability is deteriorated. Therefore, in order to stabilize metal nanoparticles, it is necessary to protect them with a protective material so as to prevent the fusion.

In general, solution methods, vapor phase methods and the like are available as methods for producing metal nanoparticles. However, as mentioned earlier, use of a protective material is essential regardless of the type of production methods employed, and various protective materials have been proposed to date. As a protective material, it is known that, for example, proteins such as gelatin and albumin and water soluble polymers such as polyvinyl alcohol and polyvinylpyrrolidone generally provide greater protection force than the surfactants of low molecular weight (for example, refer to Patent Document 1). However, because these water soluble polymers readily form aggregates with each other, the metal nanoparticles having these water soluble polymers as protective materials also form aggregates in many cases. In addition, because the protective materials generally bond poorly to the metal surface, metal nanoparticles cannot be protected stably. This could also be another disadvantage, and thus use of the protective materials may not be an ultimate solution for solving the problem of storage stability.

As a method for solving the above problems, the present inventors have already provided, by reducing metal ions such as silver nitrate in the presence of a terpolymer formed of a polyalkyleneimine chain with a hydrophilic polymer chain and hydrophobic polymer chain bonded thereto, a metal-fixed polymer associate in which metal nanoparticles are coordinated to, and thereby fixed to the polyalkyleneimine chain in the terpolymer (refer to Patent Document 2). According to the above method, an aqueous) dispersion formed of a terpolymer in which metal nanoparticles generated by the reduction of metal ions are retained can be obtained. However, counter ions of the metal ions used as a source material, for example, nitrate ions, remain dissolved in an aqueous medium, and it is necessary to conduct a process for removing the counter ions when using the obtained aqueous dispersion in an aqueous conductive ink, an aqueous coating material, or the like. It has been known that ionic components in the aqueous dispersion tend to remain within the surface of solid contents and cannot be removed with ease. Accordingly, it is necessary to employ a purification process such as dialysis which is usually not suited for industrial implementation. In addition, even when an operation such as centrifugation is conducted in order to recover only the metal-fixed polymer associates, an industrial implementation thereof still remains difficult, which leads not only to a complicated production process but also to an increase in cost for treating waste water produced in the production process. Moreover, implementation of such complicated post treatment step ultimately affects the association state of the metal-fixed polymer associates. As a result, it is possible that the storage stability of the metal-fixed polymer associates is impaired, and thus there is a need for further improvements.

Metal oxides such as silver oxide require no process for treating counter ions that are generated when reducing metal salts such as silver nitrate. Accordingly, various methods have been proposed in order to produce fine silver particles by using silver oxide as a source material, followed by the reduction thereof (for example, refer to Patent Documents 3 and 4). However, fine silver particles obtained in Patent Document 3 had an average particle size within a range from 1.5 μm to 2.5 μm, and Patent Document 4 only produced fine silver particles of 3 μm and thus had also failed to reduce the size smaller than the order of micrometers. When using them, for example, as a conductive material, so-called "nano-size effects" in which they can be fused at low temperatures cannot be attained, and a high temperature treatment of 400° C. or higher is required in order to achieve a practical level of conductivity. Accordingly, the types of substrates that can be used are limited, and it is also disadvantageous in terms of energy cost, and the like.

In addition, the silver-fixed polymer associates obtained in the aforementioned Patent Document 2 which used silver nitrate had a spherical shape or a polygonal shape, which had already been achieved by other conventional methods, and thus Patent Document 2 did not offer any method for controlling the morphology thereof. Nanostructures having a specific shape that is periodic as well as uniform, other than a spherical or polygonal shape, and which also have a particularly large surface are expected to be used in wide range of fields. Therefore, provision of such nanostructures using a simple and easy technique is of great industrial value.

[Patent Document 1] Japanese Unexamined Patent Application, First Publication No. Hei 8-027307
[Patent Document 2] Japanese Unexamined Patent Application, First Publication No. 2006-213887
[Patent Document 3] Japanese Unexamined Patent Application, First Publication No. Hei 9-111317
[Patent Document 4] Japanese Unexamined Patent Application, First Publication No. 2005-220380

DISCLOSURE OF INVENTION

Problems to be Solved by the Invention

An object of the present invention is to provide a method for producing silver-containing nanostructures which is suited for the industrial production, and a silver-containing nanostructure having a specific shape.

Means for Solving the Problems

As a result of intensive and extensive studies in order to solve the above-mentioned problems, the present inventors discovered the following:

a dispersion of silver-containing nanostructures can be obtained without requiring complicated post treatment step, by reducing silver oxide in the presence of a polymeric compound that includes at least two kinds of segments, i.e., a segment that contributes to the development of high dispersibility, and another segment which is capable of fixing fine silver particles or reducing silver ions;

the obtained dispersion of silver-containing nanostructures exhibits superior storage stability; and structures having a specific branched structure can be obtained by using a specific complexing agent when carrying out the above-mentioned reduction reaction; and they were thus able to complete the present invention.

That is, the present invention provides a method for producing a silver-containing nanostructure which is characterized by dispersing a polymeric compound (X) in which a hydrophilic segment (b) is bonded to a polyalkyleneimine chain (a) in a medium, followed by the addition of silver oxide (Y) thereto to effect a reduction reaction of the silver oxide (Y), thereby obtaining the silver-containing nanostructure; and also provides a silver-containing nanostructure having a branched structure which can be obtained by using amines as a complexing agent during the reduction reaction.

Effect of the Invention

The silver-containing nanostructure obtained in the present invention has a certain structure having a size on the order of nanometers in which silver and a polymeric compound are integrated due to the reduction of silver oxide caused by the high reduction capacity, coordination bonding force and electrostatic interactions of the polyalkyleneimine chain within the polymeric compound, and is thus obtained in the form of a dispersion of the silver-containing nanostructure dispersed in a medium. Although the dispersion contains no ionic impurities therein and thus can be used as it is, it is also possible to easily concentrate the dispersion and isolate by further removing the medium through a simple operation such as distillation. The isolated silver-containing nanostructure can then be mixed as a metallic material/conductive material or the like for constituting compositions depending on various applications.

In addition, the dispersion of silver-containing nanostructures obtained in the present invention exhibits excellent storage stability without impairing dispersion stability because even when the aforementioned polyalkyleneimine chain initiates a contraction or the like during the reduction reaction due to the aforementioned function of the polyalkyleneimine chain in the polymeric compound and thereby causes morphology of the polymeric compound to change, a hydrophilic segment within the polymeric compound develops a high affinity with an aqueous medium as well as strong repulsive force due to the interactions among the segments. When a medium is non-aqueous, stability of the dispersion can be similarly retained by the formation of a dispersion core portion due to the interactions among the hydrophilic segments within the polymeric compound. At this time, it is also possible for the aforementioned structures to obtain the structure which is specific and similar to periodic configuration so-called "fractals", depending on the types of complexing agent used at the time of reduction reaction of silver oxide.

In addition, the silver-containing nanostructure obtained in the present invention has a certain structure having a size on the order of nanometers and composed of silver and a polymeric compound, the ratio of silver and the polymeric compound in terms of their content is readily adjustable, thus the content of silver within the silver-containing nanostructure can be increased, and can be suitably used as a conductive material or the like. Furthermore, the silver-containing nanostructure obtained in the present invention can be applied in a wide range of fields, including catalysts, electronic materials, magnetic materials, optical materials, various types of sensors, color materials and medical testing applications, since the silver-containing nanostructure exhibits various characteristics typical to fine silver particles having a particle size on the order of nanometers, such as large specific surface areas, high surface energy and plasmon absorption, and also efficiently develops properties such as dispersion stability and storage stability, as well as various chemical, electrical and magnetic properties required as a conductive paste or the like. In addition, the method for producing silver-containing nanostructure according to the present invention generates no ionic impurities, which require a post treatment, since the method employs a reduction reaction using silver oxide, and is thus highly advantageous as an industrial production process since the medium or complexing agent used can be removed by operations such as distillation and the method requires hardly any complicated purification process, elaborate condition settings, or the like.

BEST MODE FOR CARRYING OUT THE INVENTION

A method for producing a silver-containing nanostructure according to the present invention is characterized in that a polymeric compound (X) where a hydrophilic segment (b) is bonded to a polyalkyleneimine chain (a) is dispersed in a medium, followed by the addition of silver oxide (Y) to the medium and carrying out of a reduction reaction of the silver oxide (Y). The silver-containing nanostructure produced in this manner is obtained in the form of a dispersion where the silver-containing nanostructure is uniformly dispersed in the medium, and the dispersion exhibits superior dispersion stability and storage stability. In addition, by removing the medium through operations such as distillation, the silver-containing nanostructure is readily isolated, and depending on the method for reducing silver oxide, it is also possible to develop a specific branched structure. It should be noted that in the present invention, a silver-containing nanostructure refers to a structure having a size on the order of nanometers and which is formed by the integration of fine silver particles obtained due to the reduction of silver oxide (note that the "fine particles" referred to herein are not necessarily completely spherical and their shapes are not limited) and a polymeric compound used in the present invention having a specific structural unit (refer to the accompanying drawings: although the silver-containing nanostructure may have various forms such as spherical, polygonal, and branched structures, the structure depicted here includes silver and a polymeric compound); and a dispersion of silver-containing nanostructure refers to those in which the structure is dispersed in a medium.

The polyalkyleneimine chain (a) that constitutes the polymeric compound (X) used in the present invention is a polymer chain that stabilizes and holds silver as fine particles since alkyleneimine units within the chain are capable of forming coordination bonds with silver or silver ions. The structure thereof contains secondary amine alkyleneimine units as the main repeating units, and may be either linear or branched, and the form thereof may be appropriately selected according to the size of the target silver-containing nanostructure and the like.

For example, the size of the silver-containing nanostructure obtained by the method for producing a silver-containing nanostructure according to the present invention is affected not only by the molecular weight of the polymeric compound (X) used or the molecular weight of the polyalkyleneimine chain (a), but also by the structures and compositional ratios of each component constituting the polymeric compound (X), namely the polyalkyleneimine chain (a) and the hydrophilic segment (b) to be described later. When using the polyalkyleneimine chains (a) having the same molecular weight, the particle size of the resulting silver-containing nanostructure tends to be large if the degree of branching is low, and as the degree of branching increases, the particle size tends to decrease. Furthermore, a branched polyalkyleneimine chain is preferable in order to increase the content rate of silver in the silver-containing nanostructure. In addition, in those cases where the silver-containing nanostructure is produced and stored in a hydrophilic solvent, the use of a linear polyalkyleneimine chain exhibiting crystallinity in the solvent enables the resulting dispersion of silver-containing nanostructure to develop particularly superior dispersion stability and storage stability. Taking these viewpoints into consideration, it is preferable to select an appropriate polyalkyleneimine chain (a) depending on the type of medium used or intended applications and physical properties.

In general, commercially available branched polyalkyleneimines are branched due to tertiary amines thereof, and can be used directly as source materials of the polymeric compound (X) used in the present invention. From the viewpoint of obtaining a dispersion of silver-containing nanostructure of a desirable particle size capable of maintaining stable dispersibility, the degree of branching, when expressed as the molar ratio of (tertiary amine)/(total amines), is preferably within the range of (1 to 49)/100, and in consideration of such factors as industrial productivity and availability, is more preferably within the range of (15 to 40)/100.

The molecular weight of the aforementioned polyalkyleneimine chain (a) is not particularly limited, however, when the molecular weight is too low, capacity of the polymeric compound for holding silver is easily reduced, which may lead to unsatisfactory storage stability. On the other hand, when the molecular weight is too high, the size of the silver-containing nanostructure readily increases and becomes massive, which may adversely affect the storage stability of the dispersion thereof at times. Accordingly, in order to obtain a silver-containing nanostructure and a dispersion thereof that have even more superior storage stability, the number average molecular weight of the aforementioned polyalkyleneimine chain (a) is typically within the range from 300 to 200,000, preferably within the range from 1,000 to 150,000, and most preferably within the range from 1,800 to 100,000.

In general, the aforementioned polyalkyleneimine chain (a) can be used without any particular limitations, and any chain can be used as long as it is commercially available or can be synthesized. However, in view of industrial availability and the like, it is preferably a linear polyethyleneimine chain, a linear polypropyleneimine chain, or a branched polyethyleneimine chain, and a branched polyethyleneimine chain is particularly preferred.

The hydrophilic segment (b) that constitutes the polymeric compound (X) used in the present invention has, when the polymeric compound (X) is dispersed in a hydrophilic solvent such as water, high affinity with the solvent, and is thus a segment that retains the dispersion stability when forming a structure. In addition, when dispersed in a hydrophobic solvent, the hydrophilic segment (b) plays a role in forming a core due to its potent intramolecular or intermolecular association strength when forming a dispersion by making several structures to associate. The molecular weight of the hydrophilic segment (b) is not particularly limited, however, when dispersed in a hydrophilic solvent, the dispersion stability deteriorates if the molecular weight is too low, whereas several structures may form aggregates with each other if the molecular weight is too high. On the other hand, when dispersed in a hydrophobic solvent, the association strength between the structures becomes poor if the molecular weight is too low, whereas formation of a dispersion becomes difficult if the molecular weight is too high. From these viewpoints, the number average molecular weight of the hydrophilic segment (b) is typically within the range from 100 to 200,000, and preferably within the range from 300 to 150,000. Moreover, in those cases where the hydrophilic segment (b) is a polyoxyalkylene chain, it is particularly preferred that the number average molecular weight thereof be within the range from 500 to 50,000.

In general, the hydrophilic segment (b) can be used without any particular limitations, and any segment can be used as long as it is composed of a hydrophilic polymer chain which is commercially available or which can be synthesized. Since a dispersion having superior stability can be obtained especially when a hydrophilic solvent is used, the hydrophilic segment (b) is preferably composed of a nonionic polymer chain.

Examples of the hydrophilic segment (b) include polyoxyalkylene chains such as a polyoxyethylene chain and a polyoxypropylene chain; polymer chains composed of polyvinyl alcohols such as a polyvinyl alcohol or a partially saponified polyvinyl alcohol; polymer chains composed of water-soluble poly(meth)acrylic acid esters such as poly hydroxyethyl acrylate, poly hydroxyethyl methacrylate, dimethylaminoethyl acrylate and dimethylaminoethyl methacrylate; poly acylalkyleneimine chains having a hydrophilic substituent such as poly acetylethyleneimine, poly acetylpropyleneimine, poly propionylethyleneimine and poly propionylpropyleneimine; and polymer chains composed of polyacrylamides such as polyacrylamide, polyisopropylacrylamide or polyvinylpyrrolidone. Among these, from the viewpoints of obtaining a dispersion having particularly superior stability and industrial availability, the hydrophilic segment (b) is preferably a polyoxyalkylene chain, and most preferably a polyoxyethylene chain.

It is also possible to further include a hydrophobic segment (c) in the polymeric compound (X) used in the present invention. From the viewpoint of dispersion stability, the hydrophobic segment (c) is bonded to the aforementioned polyalkyleneimine chain (a). By including the hydrophobic segment (c) within the polymeric compound (X), in those cases where the polymeric compound (X) is dispersed in a hydrophilic solvent such as water, it forms a core during the association and stabilization of structures and is thus capable of forming a stable dispersion due to its potent intramolecular or intermolecular association strength. On the other hand, in those cases where the polymeric compound (X) is dispersed in a hydrophobic solvent, it is capable of achieving superior dispersion stability due to its high affinity with the solvent.

In general, the hydrophobic segment (c) can be used without any particular limitations, and any segment can be used as long as it has a structure composed of a hydrophobic compound which is commercially available or which can be synthesized. Examples of the hydrophobic segment (c) include polystyrenes such as polystyrene, polymethylstyrene, polychloromethylstyrene and polybromomethylstyrene; non-water-soluble poly(meth)acrylic acid esters such as poly methyl acrylate, poly methyl methacrylate, poly 2-ethylhexyl acrylate and poly 2-ethylhexyl methacrylate; polymer chains composed of polyacylalkyleneimines having a hydrophobic substituent such as a benzoyl group, a (meth)acryloyl group, and a fluorine-containing hydrocarbon group, represented by polybenzoylethyleneimine, polybenzoylpropyleneimine, poly(meth)acryloylethyleneimine, poly(meth)acryloylpropyleneimine, poly[N-{3-(perfluorooctyl)propionyl}ethyleneimine] and poly[N-{3-(perfluorooctyl)propionyl}propyleneimine; and segments composed of resins such as epoxy resin, polyurethane and polycarbonate. These segments may be a segment composed of a single compound or may be a segment composed of a compound obtained by reacting two or more types of different compounds in advance.

There are no particular limitations on the epoxy resin and any epoxy resins can be used as long as they are commercially available or can be synthesized. Examples of the epoxy resins include a bisphenol A type epoxy resin, a bisphenol F type epoxy resin, a biphenyl type epoxy resin, a naphthalene type epoxy resin, a tetrafunctional naphthalene type epoxy resin, a tetramethylbiphenyl type epoxy resin, a phenol novolak type epoxy resin, a cresol novolak type epoxy resin, a bisphenol A novolak type epoxy resin, a triphenylmethane type epoxy resin, a tetraphenylethane type epoxy resin, a dicyclopentadiene-phenol addition reaction type epoxy resin, a phenol aralkyl type epoxy resin, a naphthol novolak type epoxy resin, a naphthol aralkyl type epoxy resin, a naphthol-phenol co-condensed novolak type epoxy resin, a naphthol-cresol co-condensed novolak type epoxy resin, an aromatic hydrocarbon formaldehyde resin-modified phenol resin type epoxy resin, a biphenyl novolak type epoxy resin, and a xanthene type epoxy resin described in Japanese Unexamined Patent Application, First Publication No. 2003-201333. These epoxy resins may be used alone or two or more types thereof may be mixed. Among these, from the viewpoint of, for example, superior adhesion with a substrate when using the resulting silver-containing nanostructure as an electrically conductive paste, it is preferable to use a bisphenol A type epoxy resin. In addition, from the viewpoint of obtaining a dispersion of silver-containing nanostructure which exhibits potent association strength in a hydrophilic solvent as well as superior dispersion stability and storage stability, it is preferable to use an epoxy resin having three or more functional groups, such as a tetrafunctional naphthalene type epoxy resin. In addition, these epoxy resins may be used directly as a source material of the polymeric compound (X), or may be modified in various ways in accordance with the structure and so forth of the target polymeric compound (X).

There are no particular limitations on the polyurethane and any polyurethanes can be used as long as they are commercially available or can be synthesized. The polyurethane is typically a polymer obtained by an addition reaction between polyols and polyisocyanates. Examples of the polyols include propylene glycol, neopentyl glycol, polypropylene glycol, polytetramethylene ether glycol, polyester polyol, polycaprolactone polyol, polycarbonate diol, bisphenol A, bisphenol F, 4,4'-dihydroxybiphenyl, 3,3',5,5'-tetramethylbiphenyl-4,4'-diol, phenol novolak, cresol novolak, propanediol, butanediol, pentanediol, n-hexanediol, cyclohexanediol, methylpentanediol, polybutadiene dipolyol, trimethylolpropane, dihydroxybenzene, compounds having two or more glycidyl functional groups, and compounds modified from the previously listed epoxy resins. These polyols may be used alone or two or more types thereof may be used as a mixture.

In addition, examples of the polyisocyanates include diphenylmethane diisocyanate, tolylene diisocyanate, xylylene diisocyanate, bis(isocyanatemethyl)cyclohexane, hexamethylene diisocyanate, 1,5-naphthylene diisocyanate, tetramethylxylene diisocyanate, isophorone diisocyanate, hydrogenated xylylene diisocyanate, dicyclohexylmethane diisocyanate, hexamethylene diisocyanate, dimer acid diisocyanate, norbornene diisocyanate and trimethylhexamethylene diisocyanate, and these polyisocyanates may be used alone or two or more types thereof may be used as a mixture.

Among these, from the viewpoint of having superior adhesion with various substrates formed with inorganic materials or hybrid materials and the like when using the resulting silver-containing nanostructure as an electrically conductive paste, polypropylene glycol and bisphenol A type epoxy resin-modified polyols and the like are preferred as polyols, while hexamethylene diisocyanate and bis(isocyanatemethyl)cyclohexane and the like are preferred as polyisocyanates. It is most preferred to use polyurethanes obtained by combining these preferred source materials. In addition, these polyurethanes may be used directly as a source material of the polymeric compound (X), or they may be modified in various ways corresponding to the structure and so forth of the target polymeric compound (X).

The aforementioned polycarbonates are not particularly limited, and can be used as long as they are commercially available or can be synthesized. Polycarbonate is typically a polymer produced from a condensation reaction between bisphenol A and phosgene, diphenylcarbonate or the like. Although the polycarbonates are typified by the polycarbonate, various carbonate-type polymers which can be produced using various source materials exemplified as polyols for forming the aforementioned polyurethanes instead of using bisphenol A that is a source material of polycarbonates, can also be listed as examples of the polycarbonates.

Among these, polycarbonate is preferred from the viewpoint of, for example, superior adhesion with various substrates, such as polycarbonate substrates, when using the resulting silver-containing nanostructure as an electrically conductive paste. In addition, these polycarbonates may be used directly as a source material of the polymeric compound (X), or they may be modified in various ways corresponding to the structure and so forth of the target polymeric compound (X).

Among the examples of the hydrophobic segment (c) as listed above, hydrophobic segments formed of at least one type of compounds selected from the group consisting of polystyrene, poly(meth)acrylic acid ester, epoxy resin, polyurethane, polycarbonate and polyacylalkyleneimine having a hydrophobic substituent are preferable hydrophobic segments based on a comprehensive assessment including not only industrial availability and handling ease of each compound used as a source material, but also the degree of hydrophobic association strength when used in the polymeric compound (X). From the viewpoints of the superiority of the industrial production process of the polymeric compound (X), cost and availability in particular, it is more preferable to use polystyrene, poly methyl(meth)acrylate, epoxy resins, and polyurethanes, and it is particularly preferred to use epoxy resins.

In addition, the molecular weight of the hydrophobic segment (c) is not particularly limited, however, when dispersed in a hydrophilic solvent, the dispersion stability deteriorates if the molecular weight is too low, whereas several structures may form aggregates with each other if the molecular weight is too high. On the other hand, when dispersed in a hydrophobic solvent, the dispersibility of the dispersion becomes poor if the molecular weight is too low, whereas favorable affinity with the solvent cannot be maintained if the molecular weight is too high. From these viewpoints, the number average molecular weight of the hydrophobic segment (c) is preferably within the range from 100 to 200,000, and particularly preferred is within the range from 300 to 100,000.

The method for producing the polymeric compound (X) used in the present invention is not particularly limited, however, the method described below is preferable from the viewpoint of being able to easily synthesize the polymeric compound (X) as designed.

As mentioned earlier, the polyalkyleneimine chain (a) which are commercially available or synthesized can be suitably used. The compound constituting the hydrophobic segment (b) which are commercially available or synthesized can be suitably used.

First, an explanation is provided for the case of using a branched polyalkyleneimine chain. Synthesis of a branched polyalkyleneimine chain may be carried out by various methods and it is not particularly limited, however, examples of a typical method include a method of carrying out ring-opening polymerization of alkyleneimine using an acid catalyst. Since the ends of branched polyalkyleneimines are in the form of primary amines, when the compound constituting the hydrophilic segment has a functional group that reacts with the primary amine, a polymeric compound which can be used in the present invention can be synthesized based on the reaction therebetween. The functional group that reacts with a primary amine is not particularly limited, and examples thereof include an aldehyde group, a carboxyl group, an isocyanate group, a tosyl group, an epoxy group, a glycidyl group, an isothiocyanate group, a halogen atom, an acid chloride and a sulfonic acid chloride. Among these, a carboxyl group, an isocyanate group, a tosyl group, an epoxy group and a glycidyl group are preferable functional groups since they are advantageous in terms of the production process with respect to reactivity, handling ease and the like.

Even if the functional groups are not those that react directly with a primary amine, they may be used in so far as they can be converted to a functional group capable of reacting with a primary amine as a result of carrying out various types of treatments. For example, when the compound has a hydroxyl group, this may be reacted with a polyalkyleneimine chain through a technique that converts the hydroxyl group to a glycidyl group. Moreover, after carrying out a treatment for converting a primary amine of the branched polyalkyleneimine chain to another functional group capable of reacting with a functional group that is present in a compound constituting the hydrophilic segment, these functional groups can be reacted to synthesize the polymeric compound (X).

When the polyalkyleneimine chain (a) is a linear polyalkyleneimine chain, examples of the synthesizing methods therefor include a method in which a polyacylated alkyleneimine chain is first synthesized by living polymerization, followed by obtaining of a polymeric compound through the synthesis or introduction of a segment composed of a hydrophilic polymer chain, and the polyacylated alkyleneimine chain is then hydrolyzed.

In addition, in those cases where the hydrophobic segment (c) is further included in the polymeric compound (X) used in the present invention, it is preferable to select the order of the synthesis. The order of synthesis varies depending on the polymerization conditions such as the polymerization method used and the initiator used.

For example, an aqueous dispersion of the polymeric compound (X) can also be obtained by reacting the branched polyalkyleneimine chain with a nonionic hydrophilic polymer to obtain a compound in advance, dissolving or dispersing the resulting compound in an aqueous medium, and adding a radical initiator and radical polymerizable monomer for deriving a hydrophobic segment followed by carrying out radical polymerization. In this method, a radical starting point is generated in an amino group, for example, as a result of chain transfer of a radical generated from the radical initiator to the amino group, and the radical polymerizable monomer is polymerized from this starting point, thereby introducing a hydrophobic segment to the compound obtained by reacting the branched polyalkyleneimine chain with the nonionic hydrophilic polymer. Examples of the radical polymerizable monomers which can be used here include styrenes such as styrene, 2-methylstyrene and 3-methylstyrene; and (meth)acrylic acid esters such as methyl(meth)acrylate, ethyl(meth)acrylate and butyl(meth)acrylate, and it is preferable to use styrene and methyl(meth)acrylate from the viewpoints of industrial availability and handling ease.

Typical examples of a method for synthesizing a linear polymeric compound includes a method includes first synthesizing a segment composed of a hydrophobic polymer chain by living polymerization, and then obtaining a polyacylated alkyleneimine chain by living polymerization, and subsequently obtaining a polymeric compound by synthesizing or introducing a segment composed of a hydrophilic polymer chain thereto, followed by hydrolysis of the polyacylated alkyleneimine chain.

In addition, another method may be used to obtain the polymeric compound (X) having a linear polyalkyleneimine chain, in which a segment composed of a hydrophilic polymer chain is synthesized, and then a linear polymeric compound is obtained by synthesizing a polyacylated alkyleneimine chain and a segment composed of a hydrophobic polymer chain, followed by hydrolysis.

Moreover, an example of still another method is indicated below. In this method, a compound having a polyacylated alkyleneimine chain and a segment composed of a hydrophobic polymer chain, and having an electron-attracting end in the form of a halogen, a tosyl group or the like on the living end thereof, is first synthesized by using methods such as living radical polymerization, atom transfer radical polymerization (ATRP), and living cationic polymerization. Next, a hydrophilic polymer chain having a functional group is condensed with the resulting compound to synthesize a polymeric compound, followed by hydrolysis to obtain a polymeric compound having a polyalkyleneimine chain.

As an example of a different type of method, the following method or the like can be cited. For example, a polyacylated alkyleneimine chain is synthesized by living cationic polymerization and the like using as an initiator a hydrophilic polymer having an electron-attracting group such as a halogen and a tosyl group on the end thereof to obtain a compound having a segment composed of a hydrophilic polymer chain and a polyacylated alkyleneimine chain, and having an electron-attracting group such as a halogen and a tosyl group on the living end thereof. Then, this compound is condensed with a hydrophobic compound having a functional group on the end thereof to synthesize a polymeric compound and then carrying out hydrolysis to obtain a polymeric compound having a linear polyalkyleneimine chain.

The following describes an example of synthesizing a comb-shaped or star-shaped polymeric compound (X) using a living polymerization reaction. By using a hydrophobic compound having a plurality of electron-attracting groups, such as halogens and tosyl groups, as an initiator for living polymerization and carrying out graft polymerization using living cationic polymerization, a polyacylated alkyleneimine chain is introduced. Subsequently, a comb-shaped or star-shaped polymeric compound is obtained by introducing a segment composed of a hydrophilic polymer chain from the living end of the resulting compound by similarly using living cationic polymerization, followed by hydrolysis to obtain the polymeric compound (X) having a polyalkyleneimine chain.

The compound used as an initiator for living polymerization may be a hydrophilic polymer chain. In this case, the polymeric compound (X) can be obtained by synthesizing a polyacylated alkyleneimine chain, followed by introducing a segment composed of a hydrophobic polymer chain.

The initiators used in the various living polymerization reactions described above are not particularly limited, however, in the case of ATRP as a typical example thereof, examples of initiators include benzyl chloride, benzyl bromide, 1-(chloroethyl)benzene and 1-(bromoethyl)benzene, as well as transition metal halides as promoters such as copper chloride and copper bromide, and complexes formed with bipyridine, 4,4'-di(5-nonyl)-2,2'-bipyridine, methyl 2-bromopropionate and ethyl 2-bromoisobutyrate. In the case of living cationic polymerization, examples of initiators include methyl bromide, ethyl bromide and methyl tosylate.

Examples of the functional groups which are subjected to the aforementioned condensation reaction include hydroxyl groups, carboxyl groups and amino groups, and the reaction can be carried out in the presence of a basic compound. Examples of the basic compounds which can be used include inorganic bases such as sodium hydroxide, potassium hydroxide, sodium carbonate and potassium carbonate, and organic bases such as sodium t-butoxide and potassium t-butoxide.

A reaction solvent can be used when carrying out a living polymerization reaction or condensation reaction as described above, and an aprotic solvent can typically be used preferably. Among these, it is particularly preferable to use N,N-dimethylacetamide (DMA), N,N-dimethylformamide (DMF) or the like.

Typical examples of methods for synthesizing the polymeric compound (X) are described below.

(I) A commercially available product is used as a branched polyalkyleneimine, and a tosylate of polyethylene glycol monomethyl ether is used as a hydrophilic polymer. The hydrophilic polymer can be obtained, for example, by reacting polyethylene glycol monomethyl ether and tosyl chloride in a polar solvent in the presence of pyridine. An epoxy resin having epoxy groups on the terminal ends thereof is used as a hydrophobic polymer. In those cases where a combination of these materials are used, the polyethyleneimine is first dissolved in a polar solvent and is then reacted with the tosylate of polyethylene glycol monomethyl ether in the presence of an alkali such as potassium carbonate at 100° C. to synthesize a compound having a structure containing a polyethylene glycol moiety and a polyethyleneimine moiety. Subsequently, the epoxy resin in a mixed solvent of acetone and methanol is added and reacted with the resulting compound at 60° C. to obtain a polymeric compound having a polyethylene glycol-polyethyleneimine-epoxy resin structure.

(II) A commercially available product is used as a branched polyalkyleneimine and the tosylate of the polyethylene glycol monomethyl ether obtained in the same manner as described in (I) above is used as a hydrophilic polymer. As a hydrophobic polymer, polystyrene having a single brominated terminal end synthesized by ATRP is used. The polystyrene can be synthesized, for example, by carrying out living radical polymerization of styrene monomers in a toluene solvent in the presence of bipyridine, copper bromide and 1-bromoethylbenzene. In those cases where a combination of these materials are used, the polystyrene having a single brominated terminal end is first dissolved in a polar solvent and is then treated with an alkali such as sodium hydroxide to obtain polystyrene of which one end is hydroxylated. Moreover, tosyl chloride is allowed to react in a polar solvent in the presence of pyridine to obtain polystyrene of which one end is tosylated. By then reacting this resultant with the compound having a structure containing a polyethylene glycol moiety and a polyethyleneimine moiety obtained in the same manner as (I) above in a polar solvent and in the presence of an alkali such as potassium carbonate at 100° C., a polymeric compound having a polyethylene glycol-polyethyleneimine-polystyrene structure can be obtained.

(III) Sulfonylated polyethylene glycol monomethyl ether is used as a polymerization initiator to carry out living cationic polymerization of 2-methyloxazoline in dimethylacetamide. Following completion of the reaction, 2-phenyloxazoline is subjected to living cationic polymerization to obtain a polymeric compound having a polyethylene glycol-polyacetylethyleneimine-polybenzoylethyleneimine structure.

Moreover, a polymeric compound having a polyethylene glycol-polyethyleneimine-polybenzoylethyleneimine structure can be obtained by subjecting a polyacetylethyleneimine segment to acid hydrolysis.

(IV) First, ATRP is carried out on a styrene monomer in toluene in the presence of benzyl bromide, copper bromide and bipyridine to synthesize polystyrene having a single brominated terminal end. This resultant is then used as a polymerization initiator to carry out living cationic polymerization of 2-methyloxazoline in dimethylacetamide to obtain a compound with a brominated terminal end and having a structure containing a polyacetylethyleneimine moiety and a polystyrene moiety.

On the other hand, the acetyl groups in vinyl acetate are subjected to partial hydrolysis in dimethylacetamide using sodium methoxide, and a reaction solution that contains the compound with a brominated terminal end and having a structure containing a polyacetylethyleneimine moiety and a polystyrene moiety at least an equimolar amount with respect to the —ONa moiety is then introduced, thereby obtaining a polymeric compound having a polyvinyl acetate-polyacetylethyleneimine-polystyrene structure. Moreover, by further subjecting the resulting compound to acid hydrolysis, a polymeric compound having a polyvinyl alcohol-polyethyleneimine-polystyrene structure can be obtained.

(V) Sulfonylated epoxy resin is used as a polymerization initiator to carry out living cationic polymerization of 2-methyloxazoline in dimethylacetamide. Subsequently, a polymeric compound having a polypropionylethyleneimine-polyacetylethyleneimine-epoxy resin structure is obtained by carrying out living cationic polymerization of 2-ethyloxazoline. Moreover, a polymeric compound having a polypropionylethyleneimine-polyethyleneimine-epoxy resin structure can be obtained by subjecting a polyacetylethyleneimine segment to alkali hydrolysis.

(V) Sulfonylated epoxy resin is used as a polymerization initiator to carry out living cationic polymerization of 2-methyloxazoline in dimethylacetamide. Polyethylene glycol monomethyl ether is then reacted with the tosylated terminal end of the copolymer synthesized above to obtain a polymeric compound having a polyethylene glycol monomethyl ether-polyacetylethyleneimine-epoxy resin structure. Moreover, a polymeric compound having a polyethylene glycol-polyethyleneimine-epoxy resin structure can be obtained by subjecting a polyacetylethyleneimine segment to acid hydrolysis.

Furthermore, various reaction conditions for the sulfonylation of epoxy resin, living polymerization of this sulfonylated epoxy resin, hydrolysis of a polyacetyl ethyleneimine segment and the like are in accordance with, for example, the method described in Japanese Unexamined Patent Application, First Publication No. 2005-307185.

The molar ratio (a):(b) of the polymers constituting the chains of each component of the polymeric compound (X) used in the present invention (i.e., polyalkyleneimine chain (a) and the hydrophilic segment (b)) is not particularly limited, however, from the viewpoint of superior association strength, dispersion stability and storage stability of the resulting silver-containing nanostructure, the ratio is typically within the range of 1:(1 to 100) and preferably within the range of 1:(1 to 30). In addition, in those cases where the hydrophobic segment (c) is further included in the polymeric compound (X) used in the present invention, the molar ratio (a):(b):(c) of the polymers constituting the chains of each component i.e. polyalkyleneimine chain (a), the hydrophilic segment (b) and the hydrophobic segment (c) is not particularly limited, however, from the viewpoint of superior association strength, dispersion stability and storage stability of the resulting silver-containing nanostructure, the ratio is typically within the range of 1:(1 to 100):(1 to 100) and preferably within the range of 1:(1 to 30):(1 to 30).

The polymeric compound (X) used in the present invention has the hydrophilic segment (b) and may also include the hydrophobic segment (c), in addition to the polyalkyleneimine chain (a) capable of allowing silver to remain stable. As has been previously described, the hydrophilic segment (b) exhibits potent association strength in a hydrophobic solvent, while exhibiting high affinity with solvent in a hydrophilic solvent. In addition, the hydrophobic segment (c) exhibits potent association strength in a hydrophilic solvent, while exhibiting high affinity with solvent in a hydrophobic solvent. Moreover, in those cases where an aromatic ring is present in the hydrophobic segment (c), the π electrons of the aromatic ring interact with silver, and this is thought to contribute to further stabilization of the silver-containing nanostructure.

The aforementioned polymeric compound (X) forms a dispersion (micelle) in various types of media such as water, hydrophilic solvent or hydrophobic solvent in accordance with the medium thereof. There are no particular limitations on those which can be used as a medium, and the dispersion formed may be either an oil-in-water system (O/W system) or a water-in-oil system (W/O system). Various solvents such as a hydrophilic solvent, a hydrophobic solvent, a mixed solvent thereof or a mixed solvent combining the use of other solvents as will be described later can be selected for use according to the intended use of the resulting silver-containing nanostructure or the dispersion thereof. In those cases where a mixed solvent is used, the mixing ratio is preferably such that the amount of hydrophilic solvent is larger when using an O/W system and that the amount of hydrophobic solvent is larger when using a W/O system. The mixing ratio cannot be limited unconditionally since it varies depending on the type of polymeric compounds used. However, as an example as a general reference thereof, a hydrophilic solvent of at least five times the amount of hydrophobic solvent in terms of volume is preferably used when using an O/W system, while a hydrophobic solvent of at least five times the amount of hydrophilic solvent is preferably used when using a W/O system.

Examples of the hydrophilic solvents include methanol, ethanol, isopropyl alcohol, tetrahydrofuran, acetone, dimethylacetamide, dimethylformamide, ethylene glycol, propylene glycol, ethylene glycol monomethyl ether, propylene glycol monomethyl ether, ethylene glycol dimethyl ether, propylene glycol dimethyl ether, dimethyl sulfoxide, dioxirane and N-methylpyrrolidone, and these may be used alone or two or more types thereof may be mixed for use.

Examples of the hydrophobic solvents include hexane, cyclohexane, ethyl acetate, butanol, methylene chloride, chloroform, chlorobenzene, nitrobenzene, methoxybenzene, toluene and xylene, and these may be used alone or two or more types thereof may be mixed for use.

Examples of other solvents which can be used by mixing with the hydrophilic solvent or hydrophobic solvent include propyl acetate, butyl acetate, isobutyl acetate, ethylene glycol monomethyl ether acetate and propylene glycol monomethyl ether acetate, and these may be appropriately selected for use depending on the application of the resulting silver-containing nanostructure or the like.

The method used to disperse the polymeric compound (X) in a medium and prepare a dispersion is not particularly limited, and usually the dispersion can easily be prepared by allowing to stand undisturbed at room temperature or by stirring. However, an ultrasonic treatment, a heat treatment or the like may also be carried out as necessary. In addition, in those cases where the compatibility with the medium is low due to the crystallinity of the polymeric compound (X) and the like, for example, the polymeric compound (X) may be dissolved or swollen in a small amount of a good solvent followed by dispersing in the target medium. This is even more effective if an ultrasonic treatment or a heat treatment is carried out at this time.

In the case of using a mixture of a hydrophilic solvent and a hydrophobic solvent, it is not necessary to apply any particularly limitations on the mixing method or mixing order thereof, and mixing may be carried out using various methods. Since differences may occur in the affinity or dispersibility with each type of solvent depending on the type or composition and so forth of the polymeric compound (X) used, the solvent mixing ratio, mixing order, mixing method, mixing conditions and the like are preferably selected appropriately according to the objective.

In the polyalkyleneimine chain (a) within the aforementioned polymeric compound (X), silver oxide used in the method for producing the silver-containing nanostructure of the present invention is, for example, spontaneously reduced at room temperature or by heating, after having coordinated with a polyethyleneimine chain, and is converted to nonionic fine silver particles. The content rate of the polymeric compound (X) and silver oxide (Y) used is not particularly limited, however, it depends on the field of application, and, for example, in order to obtain a thin silver film having high electrical conductivity by fusing silver-containing nanostructures at low temperatures, it is necessary to enhance the content of silver within the silver-containing nanostructures which are composed of the polymeric compound (X) and silver. When the silver content is excessively low, properties of the silver-containing nanostructures which originate from silver such as electrical conductivity are difficult to develop, while when the silver content is excessively high, the relative weight of silver in the dispersion of silver-containing nanostructure increases, and the silver-containing nanostructure is expected to precipitate. Accordingly, the content of silver oxide (Y) used with respect to the combined total amount of the polymeric compound (X) and silver oxide (Y) is typically at least 10% by mass, preferably at least 80% by mass, and more preferably at least 90% by mass.

In particular, the alkyleneimine unit of the polyalkyleneimine chain (a) in the polymeric compound (X) used in the production method of the present invention exhibits not only the capability for reducing silver oxide (Y) but also the capability for forming strong coordination bond with silver or silver ions. Accordingly, with respect to the silver-containing nanostructure obtained in the present invention, although it is possible to hold one fine silver particle within one polymeric compound (X), it is also possible to hold a plurality of fine silver particles within the polymeric compound (X) and the ratio in terms of their content is also readily adjustable. Therefore, the content of silver within the silver-containing nanostructure can be increased to 95% by mass or more, and even to 98% by mass or more, and the resulting silver-containing nanostructure can be suitably used as a conductive material such as an electrically conductive paste.

In the method for producing the silver-containing nanostructure of the present invention, there are no particular limitations on the method used for mixing a medium in which the polymeric compound (X) is dispersed and silver oxide (Y). The mixing method may be a method in which silver oxide (Y) is added to the medium where the polymeric compound (X) is dispersed, a reverse method thereof, or a method in which they may be simultaneously added to the same container from different containers. The mixing method such as stirring is not also particularly limited.

As described above, within the polyalkyleneimine chain (a) of the polymeric compound (X), the silver oxide (Y) used in the method for producing the silver-containing nanostructure of the present invention is, for example, coordinated to the polyethyleneimine chain and is then spontaneously reduced. However, it is also possible to use a complexing agent (Z1) during the process in which the silver oxide (Y) is coordinated to the polymeric compound (X).

The upper limit for the amount of the aforementioned complexing agent (Z1) added is not particularly specified as long as the amount is sufficient enough to coordinate the complexing agent (Z1) with the silver oxide (Y) to form a complex. However, the amount added is preferably no greater than 40 times the molar amount of the silver oxide (Y) used, and more preferably no greater than 20 times the molar amount of the silver oxide used. In addition, the method for adding the aforementioned complexing agent (Z1) is not also particularly limited, for example, the complexing agent can be added directly or can be added in after dissolving and/or dispersing in an aqueous solution or other solvent.

It is possible to control the structure (namely, morphology) of the resulting silver-containing nanostructure depending on the type of the complexing agent (Z1) used in the production of silver-containing nanostructure of the present invention. For example, silver-containing nanostructures having a polygonal shape are readily formed when ammonia is used as the aforementioned complexing agent (Z1), and silver-containing nanostructures having a spherical shape are readily formed when methylaminoethanol, dimethylaminoethanol, ethanolamine, diethanolamine, methyl diethanolamine, propanolamine, butanolamine, dimethylaminopropanol, or the like is used.

Moreover, silver-containing nanostructures having a specific branched structure can be obtained (refer to accompanying drawings) when amines of two or more valences, thiols of two or more valences, or amine thiol compounds are used, including diamine-series compounds such as ethylenediamine, N,N,N',N'-tetramethylethylenediamine, 1,3-diaminopropane, 1,4-diaminobutane, N,N,N',N'-tetramethyl-1,3-diaminopropane and piperazine; diethylenetriamine; dithiol-series compounds such as 1,2-ethanedithiol, 1,3-propanedithiol, 1,4-butanedithiol and 2,3-butanedithiol; aminothiol-series compounds such as 2-aminoethanethiol, thiazolidine, thiomorpholine and L-cysteine. In this branched structure, a structure having a constant thickness and length is serving as a basic unit, and a plurality of these units are repeatedly linked so as to form numerous branch points as a result. In other words, the branched structure is similar to structures known as the fractal structures. The fractal structures are characterized by having, for example, the following features; i.e., various complex structures shaped like mountains, branching trees, and the like, and these complex structures appear complex and intricate not only macroscopically, but also microscopically because when these complex structures are enlarged, finer shapes which are similarly complex and intricate appear as a result; a periodic structure; and a large surface area. A specific branched structure obtained in the present invention also has a large surface area and contains silver having a size on the order of nanometers or less therein. Accordingly, the specific branched structures can be fused even at a lower temperature when used, for example, as a conductive material, and are expected to exhibit a specific performance depending on the fields of applications, and are thus highly useful. In terms of achieving such silver-containing nanostructures having a specific branched structure by using amines of two or more valences, thiols of two or more valences, or amine thiol compounds, it is thought that this is due to the potent coordination strength of amines or thiol groups with respect to silver which makes the growing silver particles having a size on the order of nanometers (namely, fine silver particles) to link with each other.

In the method for producing the silver-containing nanostructure of the present invention, the silver oxide (Y) is coordinated to the polyalkyleneimine chain (a) of the polymeric compound (X), for example, a polyethyleneimine chain, and is then spontaneously reduced to be converted to nonionic fine silver particles. However, it is also possible to further add a reducing agent (Z2) for reducing the silver oxide (Y). By using the reducing agent (Z2), a silver-containing nanostructure with even higher silver content can be obtained.

Various reducing agents can be used as the aforementioned reducing agent (Z2) and they are not particularly limited. A suitable reducing agent is preferably selected in accordance with the application of the resulting silver-containing nanostructure or the dispersion thereof, or the like. Examples of the reducing agents which can be used as the aforementioned reducing agent (Z2) include hydrogen; boron compounds such as sodium borohydride and ammonium borohydride; alcohols such as methanol, ethanol, propanol, isopropyl alcohol, ethylene glycol and propylene glycol; aldehydes such as formaldehyde, acetaldehyde and propionaldehyde; acids such as ascorbic acid, citric acid and sodium citrate; and hydrazines such as hydrazine and hydrazine carbonate. Among these, preferred examples of reducing agents in terms of industrial availability and handling include sodium borohydride, ascorbic acid and sodium citrate.

The amount of the aforementioned reducing agent (Z2) added is preferably equal to or more than the amount necessary to reduce the silver oxide (Y) so as to form nonionic silver fine particles. The upper limit for the amount of the aforementioned reducing agent (Z2) added is not particularly specified, however, the amount added is preferably no greater than 10 times the molar amount of silver within the silver oxide used, and more preferably no greater than 2 times the molar amount.

In addition, the method for adding the aforementioned reducing agent (Z2) is not particularly limited, for example, the reducing agent (Z2) can be added directly or can be added in after dissolving and/or dispersing in an aqueous solution or other solvent. In addition, there are also no particular limitations on the order in which the reducing agent (Z2) is added, and the reducing agent (Z2) may be added to a dispersion of the polymeric compound (X) in advance, the reducing agent (Z2) may be added simultaneously when mixing the silver oxide (Y), or the reducing agent (Z2) may be mixed several hours after mixing the dispersion of the polymeric compound (X) and the silver oxide (Y).

As was previously described, since the silver oxide (Y) is coordinated with an alkyleneimine unit and is then spontaneously reduced at room temperature or by heating, a silver-containing nanostructure can be obtained by allowing the resultant to stand undisturbed or stirring either at room temperature or by heating. However, as described above, the reducing agent (Z2) may be used in order to carry out the reduction of silver ions more efficiently, and the reduction reaction at this time is conducted by allowing the mixture to stand undisturbed or stirring either at room temperature or by heating. Although the temperature in the case of heating varies in accordance with such factors as the type of polymeric compound and types of medium and reducing agent (Z2) used, the temperature is typically 100° C. or lower and preferably 80° C. or lower.

The particle size of fine silver particles constituting the silver-containing nanostructure obtained in the present invention is not particularly limited, however, in order to attain a dispersion of silver-containing nanostructure having even higher dispersion stability, the particle size of the fine silver particles is preferably within the range from 1 to 100 nm, and more preferably within the range from 1 to 50 nm. It should be noted that the term "fine particles" does not necessarily mean that they have a completely spherical shape, but merely showing that each silver particle is present independently in minute units (having a size on the order of nanometers).

The method for isolating/concentrating the silver-containing nanostructure from the resulting dispersion of silver-containing nanostructure obtained as described above is not particularly limited, and the solvents used can be readily removed by distillation, heating, or the like. When a complexing agent having a low boiling point or a reducing agent having a low boiling point is used, it can be removed by distillation in a similar manner. Although the temperature in the case of distillation or heating varies depending on the type of medium used, the temperature needs to be such that fine silver particles within the generated silver-containing nanostructures do not fuse with each other, and is preferably within the range from room temperature to 60° C. The solvent, complexing agent, and/or reducing agent removed in this manner does not contain ionic impurities, and thus can be returned to a state where it is reusable provided that it is subjected to further separation/purification treatments such as precision distillation. This is advantageous in the industrial production thereof, and the usability of the production method according to the present invention is apparent also from this viewpoint.

Fine metal particles having a particle size on the order of several tens of nanometers typically have a characteristic optical absorption attributable to surface plasmon excitation depending on the kind of the metal. Accordingly, by measuring the plasmon absorption of the silver-containing nanostructure obtained in the present invention, the presence of silver in the form of fine particles on the nanometer order within the structure can be confirmed. Moreover, it is also possible to observe the shape and particle size thereof and the like with a transmission electron micrograph (TEM) of a film obtained by casting a dispersion of the silver-containing nanostructure or the like.

The silver-containing nanostructure obtained in the present invention is stably dispersed in all sorts of media for a long period of time. Consequently, there are no limitations on the applications thereof, and it can be used in an extremely wide range of fields, including catalysts, electronic materials, magnetic materials, optical materials, various types of sensors, color materials and medical testing applications. Since the content rate of silver can also be easily adjusted, effects in accordance with the intended objective can be efficiently attained. Moreover, since the silver-containing nanostructure obtained in the present invention remain stably dispersed for a long period of time, it is suited for long-term use and long-term storage and is thus highly useful. In addition, the method for producing silver-containing nanostructure according to the present invention generates no ionic impurities, which require a post treatment, during the reduction reaction due to the use of the silver oxide (Y), and is thus highly advantageous as an industrial production process since it requires hardly any complicated steps or elaborate setting of conditions and the like.

EXAMPLES

Although the following provides a more detailed explanation of the present invention through examples thereof, the present invention is not limited to these examples. Furthermore, percent (%) refers to percent by mass (mass %) unless specifically indicated otherwise.

Synthesis Example 1 of Polymeric Compound

Synthesis of Polymer 1

A chloroform (30 ml) solution containing 9.6 g (50.0 mmol) of p-toluenesulfonyl chloride was added dropwise to a mixed solution containing 20.0 g (10.0 mmol) of methoxy polyethylene glycol [Mn=2,000], 8.0 g (100 mmol) of pyridine and 20 ml of chloroform over the course of 30 minutes with stirring while cooling with ice in a nitrogen atmosphere. Following completion of the dropwise addition, the resulting solution was further stirred for 4 hours in a water bath at a temperature of 40° C. Following completion of the reaction, 50 ml of chloroform were added to dilute the reaction solution. Subsequently, after sequentially washing with 100 ml of 5% aqueous hydrochloric acid solution, 100 ml of aqueous saturated sodium bicarbonate solution and 100 ml of saturated brine, the resulting solution was dried with magnesium sulfate, filtered and concentrated under reduced pressure.

After washing the obtained solid material several times with hexane, it was filtered and dried under reduced pressure at 80° C. to obtain 22.0 g of a tosylated product.

The results of $^1$H-NMR (manufactured by JEOL Ltd., AL300, 300 MHz) measurement for the obtained product are shown below.

Result of $^1$H-NMR (CDCl$_3$) measurement: δ (ppm): 7.82 (d), 7.28 (d), 3.74 to 3.54 (bs), 3.41 (s), 2.40 (s)

5.39 g (2.5 mmol) of the methoxy polyethylene glycol compound having a p-toluenesulfonyloxy group at the terminal end synthesized above, 20.0 g (0.8 mmol) of branched polyethyleneimine (manufactured by Sigma-Aldrich Corporation, molecular weight: 25,000), 0.07 g of potassium carbonate and 100 ml of N,N-dimethylacetamide were stirred at 100° C. for 6 hours in a nitrogen atmosphere. 300 ml of a mixed solution of ethyl acetate and hexane (v/v=1/2) was added to the obtained reaction mixture, and the resultant was then stirred vigorously at room temperature, followed by the recovery of the reaction product in the form of a solid material by filtration. The obtained solid material was washed repeatedly twice using 100 ml of a mixed solution of ethyl acetate and hexane (v/v=1/2) and was then dried under reduced pressure to obtain 24.4 g of a polymer 1, in the form of a solid, as the polymeric compound (X) having the polyalkyleneimine chain (a) and the hydrophilic segment (b) in which a polyoxyethylene chain was bonded to a branched polyethyleneimine.

The results of $^1$H-NMR (manufactured by JEOL Ltd., AL300, 300 MHz) measurement for the obtained product are shown below.

Result of $^1$H-NMR (CDCl$_3$) measurement: δ (ppm): 3.50 (s), 3.05 to 2.20 (m)

Synthesis Example 2 of Polymeric Compound

Synthesis of Polymer 2

18.7 g (20 mEq.) of bisphenol A type epoxy resin (EPICLON AM-040-P manufactured by DIC Corporation, epoxy equivalent: 933), 1.28 g (7.5 mmol) of 4-phenylphenol, 0.26 ml (0.12 mol %) of 65% ethyl acetate triphenyl phosphonium ethanol solution and 50 ml of N,N-dimethylacetamide were allowed to react at 120° C. for 6 hours in a nitrogen atmosphere. After being allowed to cool, the obtained solution was dropwise added to 150 ml of water, and the resulting precipitate was then washed twice with methanol, followed by drying under reduced pressure at 60° C. to obtain a monofunctional epoxy resin. The amount of the obtained reaction product was 19.6 g and the yield thereof was 98%.

The results of $^1$H-NMR (manufactured by JEOL Ltd., AL300, 300 MHz) measurement for the obtained monofunctional epoxy resin are shown below.

Result of $^1$H-NMR (CDCl$_3$) measurement: δ (ppm): 7.55 to 6.75 (m), 4.40 to 3.90 (m), 3.33 (m), 2.89 (m), 2.73 (m), 1.62 (s)

To a solution composed of 3.0 g (1.5 mmol) of the monofunctional epoxy resin obtained above and 50 ml of acetone was added a solution composed of 14.4 g (0.48 mmol) of the polymer 1 obtained in Synthesis Example 1 and 60 ml of methanol, and the resulting mixture was stirred at 60° C. for 2 hours in a nitrogen atmosphere. Following completion of the reaction, solvents were removed to obtain a polymer 2 as the polymeric compound (X) having the polyalkyleneimine chain (a), the hydrophilic segment (b) and the hydrophobic segment (c) in which a polyoxyethylene chain and bisphenol A type epoxy resin were bonded to a branched polyethyleneimine chain.

Synthesis Example 3 of Polymeric Compound

Synthesis of Polymer 3

Under a nitrogen stream, 13.0 g (101 mmol) of dibutylamine was dropwise added to 20.1 g (100 mEq) of EPICLON 705 (dipropylene glycol diglycidyl ester manufactured by DIC Corporation, epoxy equivalent: 201) at 70° C. over 30 minutes, and the resulting mixture was then stirred at 90° C. for 7 hours to complete the reaction, thereby yielding a compound having dibutylamino groups at both terminal ends thereof. Subsequently, a mixture of the compound having dibutylamino groups at both terminal ends thereof synthesized above was dropwise added to a mixed solution composed of 19.4 g (100 mmol) of diisocyanate (Takenate 600 manufactured by Mitsui Takeda Chemicals Inc.), 0.04 g (0.1 mmol) of tin octylate and 80 g of chloroform at 40° C. over 30 minutes, and the resulting mixture was then stirred at 50° C. for 5 hours to effect an addition reaction, thereby yielding a urethane compound. Thereafter, 5.7 g (50 mmol) of cyclohexane methanol was dropwise added to the obtained reaction mixture of urethane compound at 40° C. over 20 minutes, and the resulting mixture was then stirred at 50° C. for 5 hours to effect an addition reaction, thereby yielding a mixture of a monofunctional isocyanate compound. Finally, a solution containing 2.76 g (2 mmol) of the obtained mixture of a monofunctional isocyanate compound and 10 ml of chloroform was gradually dropwise added to a mixed solution composed of 16.0 g (1 mmol) of the polymer 1 obtained in Synthesis Example 1 and 30 ml of chloroform at room temperature over about 10 minutes with stirring. Following completion of the dropwise addition, the resulting mixture was further stirred at 40° C. for 2 hours to complete the reaction. Following completion of the reaction, a mixed solvent of water and acetone was added to the resultant, and a mixed solvent of chloroform and acetone was then removed under reduced pressure to obtain a polymer 3 as a reaction product in which polypropylene glycol urethane and a polyoxyethylene chain were bonded to a branched polyethyleneimine chain.

Synthesis Example 4 of Polymeric Compound

Synthesis of Polymer 4

49.0 g (50 mmol) of polycarbonate diol (Nippollan 983 manufactured by Nippon Polyurethane Industry Co., Ltd.) was dropwise added to a mixed solution composed of 19.4 g (100 mmol) of diisocyanate (Takenate 600 manufactured by Mitsui Takeda Chemicals Inc.), 0.04 g (0.1 mmol) of tin octylate and 100 g of chloroform at 40° C. over 30 minutes, and the resulting mixture was then stirred at 50° C. for 5 hours to effect an addition reaction, thereby yielding a urethane compound. Thereafter, 5.7 g (50 mmol) of cyclohexane methanol was dropwise added to the obtained reaction mixture of urethane compound at 40° C. over 20 minutes, and the resulting mixture was then stirred at 50° C. for 5 hours to effect an addition reaction, thereby yielding a mixture of a monofunctional isocyanate compound. Subsequently, a solution containing 7.0 g (2 mmol) of the obtained mixture of a monofunctional isocyanate compound and 10 ml of chloroform was gradually dropwise added to a mixed solution composed of 16.0 g (1 mmol) of the polymer 1 obtained in Synthesis Example 1 and 30 ml of chloroform at room temperature over about 10 minutes with stirring. Following completion of the dropwise addition, the resulting mixture was further stirred at 40° C. for 2 hours to complete the reaction. Following completion of the reaction, a mixed solvent of water and acetone was added to the resultant, and a mixed solvent of chloroform and acetone was then removed under reduced pressure to obtain a polymer 4 as a reaction product in which polycarbonate urethane and a polyoxyethylene chain were bonded to a branched polyethyleneimine chain.

Example 1

58.8 g of an aqueous solution containing 0.296 g of the polymer 1 obtained in Synthesis Example 1 was added to 5.0 g of silver oxide and the resulting mixture was stirred at 25° C. for 30 minutes. Subsequently, 33.6 g of ethylenediamine was gradually added to the resultant with stirring. Although the reaction solution then turned blackish brown and generated heat to some degree as a result, the reaction solution was left standing as it is and was then stirred at 25° C. for 30 minutes. Thereafter, 7.6 g of a 10% aqueous solution of ascorbic acid was gradually added to the resulting reaction solution with stirring. The solution was stirred for further 20 hours while maintaining the temperature thereof to obtain a blackish brown dispersion of silver-containing nanostructures.

Figure 1:
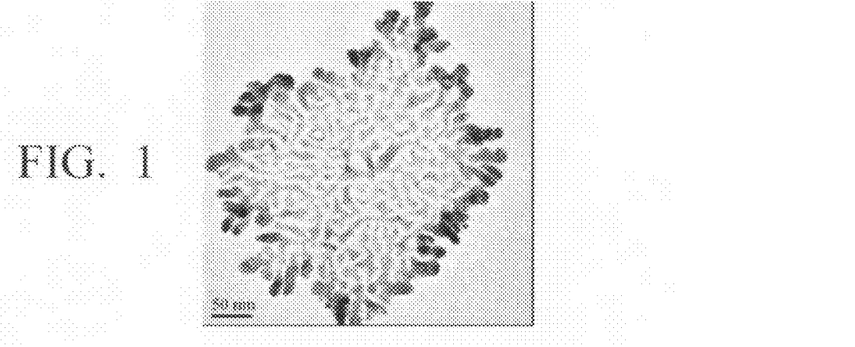
FIG. 1 is a TEM micrograph of a silver-containing nanostructure obtained in Example 1.
Figure 2:
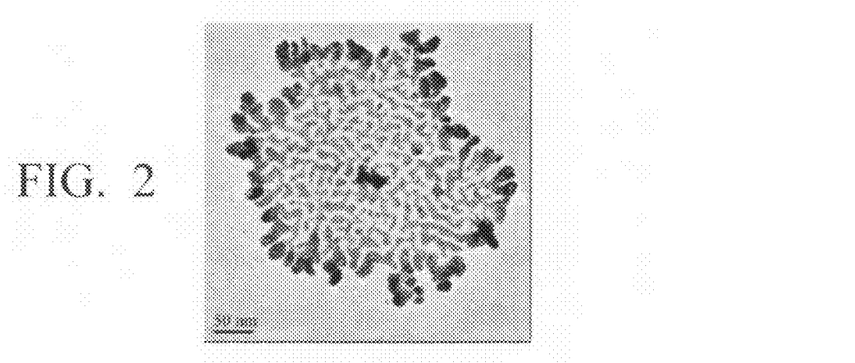
FIG. 2 is a TEM micrograph of a silver-containing nanostructure obtained in Example 1.
Figure 3:
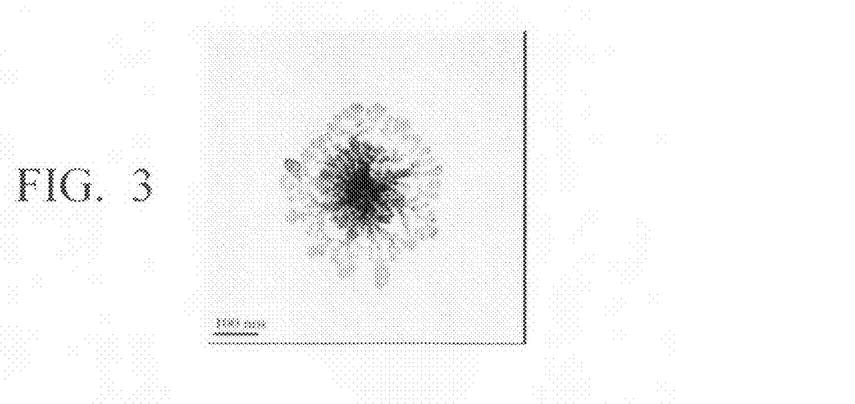
FIG. 3 is a TEM micrograph of a silver-containing nanostructure obtained in Example 1.

A portion of the obtained dispersion was sampled and a 10-fold diluted solution thereof was then subjected to a visible absorption spectrum measurement (using UV-3500 manufactured by Hitachi, Ltd.). As a result, a peak of a plasmon absorption spectrum was observed at 400 nm, thereby confirming the formation of silver nanoparticles. No formation of aggregates, precipitates, or the like was observed in the obtained dispersion even after two months, thereby confirming the superior storage stability thereof (when stored at room temperature; i.e., 15 to 25° C.). In addition, the presence of silver-containing nanostructures having a specific branched structure was verified by TEM measurements using the JEM-2200FS instrument (manufactured by JEOL Ltd.). Moreover, the silver content within the obtained silver-containing nanostructure showed 97.0% with respect to the charged amount of 94.4% as a result of measurement made by a thermogravimetry-differential thermal analysis (TG-DTA) using the TG/DTA 6300 device (manufactured by SII NanoTechnology Inc.).

Example 2

77.0 g of an aqueous solution containing 0.263 g of the polymer 2 obtained in Synthesis Example 2 was added to 5.0 g of silver oxide and the resulting mixture was stirred at 25° C. for 30 minutes. Subsequently, 23.0 g of dimethylethanolamine was gradually added to the resultant with stirring. Although the reaction solution then turned blackish red and generated heat to some degree as a result, the reaction solution was left standing as it is and was then stirred for further 20 hours while maintaining the temperature thereof at 25° C. to obtain a blackish red dispersion of silver-containing nanostructures.

Figure 4:
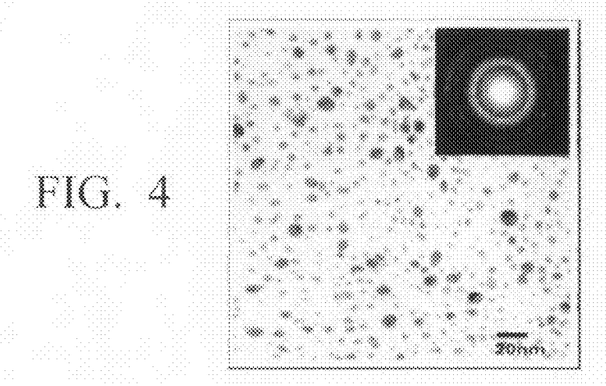
FIG. 4 is a TEM micrograph of a silver-containing nanostructure obtained in Example 2.
Figure 5:
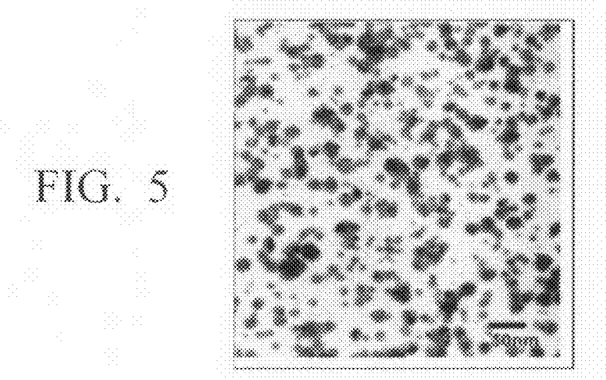
FIG. 5 is a TEM micrograph of a silver-containing nanostructure obtained in Example 2.

A portion of the obtained dispersion was sampled and a 10-fold diluted solution thereof was then subjected to a visible absorption spectrum measurement. As a result, a peak of a plasmon absorption spectrum was observed at around 400 nm, thereby confirming the formation of silver nanoparticles. No formation of aggregates, precipitates, or the like was observed in the obtained dispersion even after two months, thereby confirming the superior storage stability thereof. In addition, the presence of silver-containing nanostructures having a spherical shape was verified by TEM measurements. Moreover, the silver content within the obtained silver-containing nanostructure showed 96.2% with respect to the charged amount of 95.0% as a result of measurement made by TG-DTA.

Example 3

138.8 g of an aqueous solution containing 0.592 g of the polymer 1 obtained in Synthesis Example 1 was added to 10.0 g of silver oxide and the resulting mixture was stirred at 25° C. for 30 minutes. Subsequently, 46.0 g of dimethylethanolamine was gradually added to the resultant with stirring. Although the reaction solution then turned blackish red and generated heat to some degree as a result, the reaction solution was left standing as it is and was then stirred at 25° C. for 30 minutes. Thereafter, 15.2 g of a 10% aqueous solution of ascorbic acid was gradually added to the resulting reaction solution with stirring. The solution was stirred for further 20 hours while maintaining the temperature thereof to obtain a blackish red dispersion of silver-containing nanostructures.

Figure 6:
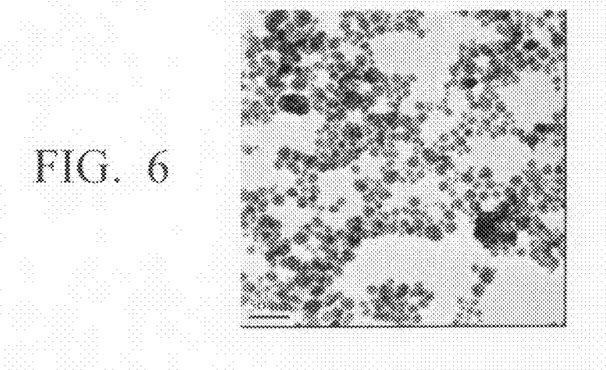
FIG. 6 is a TEM micrograph of a silver-containing nanostructure obtained in Example 3.
Figure 7:
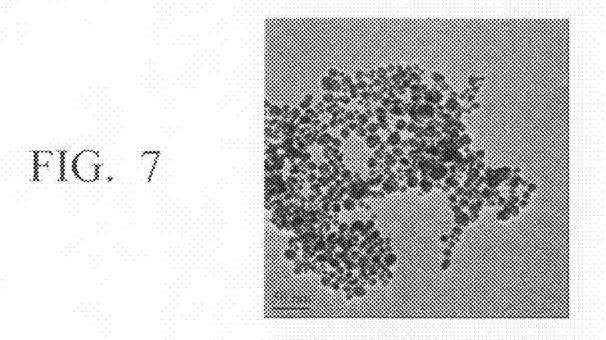
FIG. 7 is a TEM micrograph of a silver-containing nanostructure obtained in Example 3.
Figure 8:
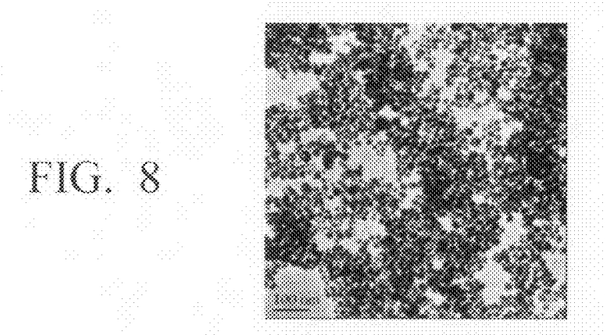
FIG. 8 is a TEM micrograph of a silver-containing nanostructure obtained in Example 3.

A portion of the obtained dispersion was sampled and a 10-fold diluted solution thereof was then subjected to a visible absorption spectrum measurement. As a result, a peak of a plasmon absorption spectrum was observed at 400 nm, thereby confirming the formation of silver nanoparticles. No formation of aggregates, precipitates, or the like was observed in the obtained dispersion even after two months, thereby confirming the superior storage stability thereof. In addition, the presence of silver-containing nanostructures having a spherical shape was verified by TEM measurements. Moreover, the silver content within the obtained silver-containing nanostructure showed 95.0% with respect to the charged amount of 94.4% as a result of measurement made by TG-DTA.

100 g of the dispersion of silver-containing nanostructures obtained above was subjected to a distillation at a degree of vacuum of 1 to 10 mmHg while heating at 30 to 50° C., and the concentration operation was carried out until the solid content of 50% was achieved. The mixed solution removed by the distillation was an aqueous solution of dimethylethanolamine and did not contain any other components. The concentrated silver-containing nanostructure was in the form of a paste. The time required for the post treatment was about 2 hours.

Example 4

90.0 g of an aqueous solution containing 0.296 g of the polymer 1 obtained in Synthesis Example 1 was added to 5.0 g of silver oxide and the resulting mixture was stirred at 25° C. for 30 minutes. Subsequently, 58.5 g of a 25% aqueous ammonia solution was gradually added to the resultant with stirring. The reaction solution turned black and was then stirred at 25° C. for 30 minutes. Thereafter, 7.6 g of a 10% aqueous solution of ascorbic acid was gradually added to the resulting reaction solution with stirring, and the resulting mixture was stirred for further 20 hours to obtain a black dispersion of silver-containing nanostructures.

Figure 9:
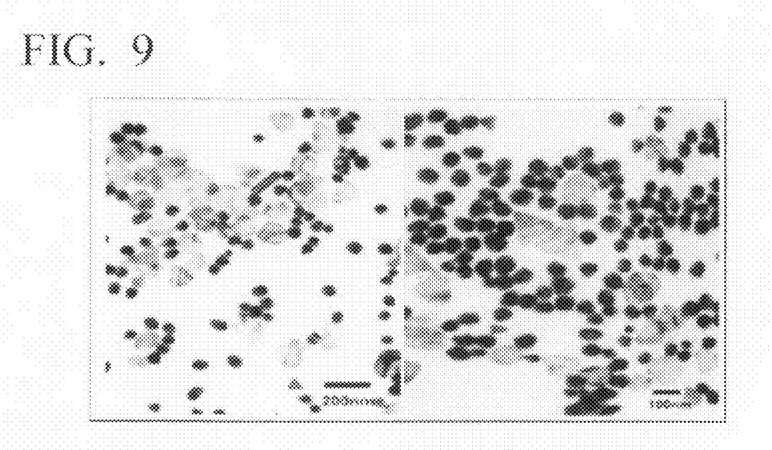
FIG. 9 is a TEM micrograph of a silver-containing nanostructure obtained in Example 4.

A portion of the obtained dispersion was sampled and a 10-fold diluted solution thereof was then subjected to a visible absorption spectrum measurement. As a result, a peak of a plasmon absorption spectrum was observed at 400 nm, thereby confirming the formation of silver nanoparticles. No formation of aggregates, precipitates, or the like was observed in the obtained dispersion even after two months, thereby confirming the superior storage stability thereof. In addition, the presence of silver-containing nanostructures having a polygonal shape was verified by TEM measurements. Moreover, the silver content within the obtained silver-containing nanostructure showed 95.7% with respect to the charged amount of 94.4% as a result of measurement made by TG-DTA.

Example 5

77.0 g of an aqueous solution containing 0.280 g of the polymer 3 obtained in Synthesis Example 3 was added to 5.0 g of silver oxide and the resulting mixture was stirred at 25° C. for 30 minutes. Subsequently, 23.0 g of dimethylethanolamine was gradually added to the resultant with stirring. Although the reaction solution then turned blackish red and generated heat to some degree as a result, the reaction solution was left standing as it is and was then stirred for further 20 hours while maintaining the temperature thereof at 25° C. to obtain a blackish red dispersion of silver-containing nanostructures.

A portion of the obtained dispersion was sampled and a 10-fold diluted solution thereof was then subjected to a visible absorption spectrum measurement. As a result, a peak of a plasmon absorption spectrum was observed at around 400 nm, thereby confirming the formation of silver nanoparticles. No formation of aggregates, precipitates, or the like was observed in the obtained dispersion even after two months, thereby confirming the superior storage stability thereof. In addition, the presence of silver-containing nanostructures having a spherical shape was verified by TEM measurements.

Example 6

77.0 g of an aqueous solution containing 0.283 g of the polymer 4 obtained in Synthesis Example 4 was added to 5.0 g of silver oxide and the resulting mixture was stirred at 25° C. for 30 minutes. Subsequently, 23.0 g of dimethylethanolamine was gradually added to the resultant with stirring. Although the reaction solution then turned blackish red and generated heat to some degree as a result, the reaction solution was left standing as it is and was then stirred for further 20 hours while maintaining the temperature thereof at 25° C. to obtain a blackish red dispersion of silver-containing nanostructures.

A portion of the obtained dispersion was sampled and a 10-fold diluted solution thereof was then subjected to a visible absorption spectrum measurement. As a result, a peak of a plasmon absorption spectrum was observed at around 400 nm, thereby confirming the formation of silver nanoparticles. No formation of aggregates, precipitates, or the like was observed in the obtained dispersion even after two months, thereby confirming the superior storage stability thereof. In addition, the presence of silver-containing nanostructures having a spherical shape was verified by TEM measurements.

Example 7

77.0 g of an aqueous solution containing 0.263 g of the polymer 2 obtained in Synthesis Example 2 was added to 5.0 g of silver oxide and the resulting mixture was stirred at 25° C. for 30 minutes. Subsequently, 23.0 g of dimethylethanolamine was gradually added to the resultant with stirring. Although the reaction solution then turned blackish red and generated heat to some degree as a result, the reaction solution was stirred as it is for 30 minutes. Thereafter, 0.76 g of sodium citrate was gradually added to the resulting reaction solution with stirring, and the resulting mixture was stirred for further 20 hours to obtain a black dispersion of silver-containing nanostructures. The reaction solution was left standing as it is and was then stirred for further 20 hours while maintaining the temperature thereof at 25° C. to obtain a blackish red dispersion of silver-containing nanostructures.

A portion of the obtained dispersion was sampled and a 10-fold diluted solution thereof was then subjected to a visible absorption spectrum measurement. As a result, a peak of a plasmon absorption spectrum was observed at around 400 nm, thereby confirming the formation of silver nanoparticles. No formation of aggregates, precipitates, or the like was observed in the obtained dispersion even after two months, thereby confirming the superior storage stability thereof. In addition, the presence of silver-containing nanostructures having a spherical shape was verified by TEM measurements. Moreover, the silver content within the obtained silver-containing nanostructure showed 96.3% with respect to the charged amount of 95.0% as a result of measurement made by TG-DTA.

Example 8

60.0 g of an aqueous solution containing 0.263 g of the polymer 2 obtained in Synthesis Example 2 was added to 5.0 g of silver oxide and the resulting mixture was stirred at 25° C. for 30 minutes. Subsequently, 35.0 g of 1,3-diaminopropane was gradually added to the resultant with stirring. Although the reaction solution then turned blackish brown and generated heat to some degree as a result, the reaction solution was left standing as it is and was then stirred at 25° C. for 30 minutes. Thereafter, 7.6 g of a 10% aqueous solution of ascorbic acid was gradually added to the resulting reaction solution with stirring. The solution was stirred for further 20 hours while maintaining the temperature thereof to obtain a blackish brown dispersion of silver-containing nanostructures.

A portion of the obtained dispersion was sampled and a 10-fold diluted solution thereof was then subjected to a visible absorption spectrum measurement. As a result, a peak of a plasmon absorption spectrum was observed at 400 nm, thereby confirming the formation of silver nanoparticles. No formation of aggregates, precipitates, or the like was observed in the obtained dispersion even after two months, thereby confirming the superior storage stability thereof. In addition, the presence of silver-containing nanostructures having a specific branched structure was verified by TEM measurements. Moreover, the silver content within the obtained silver-containing nanostructure showed 97.1% with respect to the charged amount of 95.0% as a result of measurement made by TG-DTA.

Example 9

75.8 g of an aqueous solution containing 0.250 g of the polymer 1 obtained in Synthesis Example 1 was added to 5.0 g of silver oxide and the resulting mixture was stirred at 25° C. for 30 minutes. Subsequently, 41.6 g of a 40% aqueous solution of 2-aminoethanethiol was gradually added to the resultant with stirring. The reaction solution turned light gray and was then stirred at 25° C. for 30 minutes. Thereafter, 22.8 g of a 10% aqueous solution of ascorbic acid was gradually added to the resulting reaction solution with stirring. The solution was stirred for further 20 hours while maintaining the temperature thereof to obtain a blackish gray dispersion of silver-containing nanostructures.

A portion of the obtained dispersion was sampled and a 10-fold diluted solution thereof was then subjected to a visible absorption spectrum measurement. As a result, a peak of a plasmon absorption spectrum was observed at 400 nm, thereby confirming the formation of silver nanoparticles. In addition, the presence of silver-containing nanostructures having a specific branched structure was verified by TEM measurements. Moreover, the silver content within the obtained silver-containing nanostructure showed 97.0% with respect to the charged amount of 94.4% as a result of measurement made by TG-DTA.

Example 10

72.1 g of an aqueous solution containing 0.250 g of the polymer 1 obtained in Synthesis Example 1 was added to 5.0 g of silver oxide and the resulting mixture was stirred at 25° C. for 30 minutes. Subsequently, 20.3 g of ethanedithiol was gradually added to the resultant with stirring. The reaction solution turned light gray and was then stirred at 25° C. for 30 minutes. Thereafter, 7.6 g of a 10% aqueous solution of ascorbic acid was gradually added to the resulting reaction solution with stirring. The solution was stirred for further 20 hours while maintaining the temperature thereof to obtain a blackish gray dispersion of silver-containing nanostructures.

A portion of the obtained dispersion was sampled and a 10-fold diluted solution thereof was then subjected to a visible absorption spectrum measurement. As a result, a peak of a plasmon absorption spectrum was observed at 400 nm, thereby confirming the formation of silver nanoparticles. In addition, the presence of silver-containing nanostructures having a specific branched structure was verified by TEM measurements. Moreover, the silver content within the obtained silver-containing nanostructure showed 96.2% with respect to the charged amount of 95.0% as a result of measurement made by TG-DTA.

Application Example 1

A 30 wt. % ethanol dispersion of the silver nanoparticles obtained in Example 1 (Example in which the polymer of Synthesis Example 1 and ethylenediamine were used and a nanostructure having a specific shape was obtained) was applied onto a glass plate using a bar coater (RDS60) to obtain a silver coating film. In a nitrogen atmosphere, the obtained coating film was subjected to a heat treatment at 180° C. for 30 minutes, and the resulting formed product had a mirror like silver color. The formed product had a volume specific resistance (measured using the Loresta-GP MCP-T610 device manufactured by Mitsubishi Chemical Corporation) of $7.6 \times 10^{-6}$ Ω·cm.

Application Example 2

A 30 wt. % ethanol dispersion of the silver nanoparticles obtained in Example 3 (Example in which the polymer of Synthesis Example 1 and dimethylethanolamine were used and a nanostructure having a spherical shape was obtained) was applied onto a glass plate using a bar coater (RDS60) to obtain g a silver coating film. In a nitrogen atmosphere, the obtained coating film was subjected to a heat treatment at 180° C. for 30 minutes, and the resulting formed product had a mirror like silver color. The formed product had a volume specific resistance (measured using the Loresta-GP MCP-T610 device manufactured by Mitsubishi Chemical Corporation) of $4.7 \times 10^{-6}$ Ω·cm.

Comparative Example 1

60.4 g of an aqueous solution in which 0.296 g of a commercially available branched polyethyleneimine (SP-200 manufactured by Nippon Shokubai Co., Ltd.) was dissolved instead of the polymers obtained in Synthesis Examples was added to 5.0 g of silver oxide and the resulting mixture was stirred at 25° C. for 30 minutes. Subsequently, 23.0 g of dimethylethanolamine was gradually added to the resultant with stirring. Although the reaction solution then turned blackish red and generated heat to some degree as a result, the reaction solution was left standing as it is and was then stirred at 25° C. for 30 minutes. Thereafter, 7.6 g of a 10% aqueous solution of ascorbic acid was gradually added to the resulting reaction solution with stirring. Although the resulting mixture was kept stirring while maintaining the temperature thereof, precipitates began to form as the reaction time progressed and no dispersion was obtained.

Comparative Example 2

A dispersion of silver-containing nanostructures was obtained in a similar manner to that described in Example 3 except that 14.6 g of silver nitrate was used instead of 10.0 g of silver oxide. In order to remove the nitrate ions in the dispersion, 100 g of the obtained dispersion of silver-containing nanostructures was put into a dialysis tube (RVDF 500,000 manufactured by Spectra, Inc.) and was placed in 2.5 L of water for the solute-water exchange process for about 16 hours, and the process was repeated three times. Subsequently, the obtained dialysate was repeatedly centrifuged (8,000 rpm for 5 minutes) twice, thereby obtaining silver-containing nanostructures in the form of a paste which were concentrated to a solid content of 50%. The time spent for this post treatment was about 55 hours in total, and the amount of waste water produced during the post treatment step was 10 times as much as (or even more than) that produced in Example 3. From these results, it is evident that the production method according to the present invention is a method for producing silver-containing nanostructures which makes the post treatment step easy, and thus is highly practicable industrially.

The invention claimed is:

1. A method for producing a silver-containing nanostructure comprising:
dispersing a polymeric compound (X) in which a hydrophilic segment (b) having a number average molecular weight within a range from 300 to 150,000 is bonded to a branched polyalkyleneimine chain (a) having a degree of branching within a range of (1 to 49)/100 when expressed as a molar ratio of (tertiary amine)/(total amines) and also having a number average molecular weight within a range from 1,000 to 150,000, in a medium;
adding silver oxide (Y) thereto;
adding ammonia and a reducing agent (Z2) thereto; and
carrying out a reduction reaction of the silver oxide (Y) at a temperature of 25 to 80° C., thereby obtaining a silver-containing nanostructure having a polygonal shape.

2. A method for producing a silver-containing nanostructure comprising:
dispersing a polymeric compound (X) in which a hydrophilic segment (b) having a number average molecular weight within a range from 300 to 150,000 is bonded to a branched polyalkyleneimine chain (a) having a degree of branching within a range of (1 to 49)/100 when expressed as a molar ratio of (tertiary amine)/(total amines) and also having a number average molecular weight within a range from 1,000 to 150,000, in a medium;

adding silver oxide (Y) thereto;

adding at least one complexing agent selected from the group consisting of methylaminoethanol, dimethylaminoethanol, ethanolamine, diethanolamine, methyldiethanolamine, propanolamine, butanolamine and dimethylaminopropanol, and a reducing agent (Z2), thereto; and carrying out a reduction reaction of the silver oxide (Y) at a temperature of 25 to 80° C., thereby obtaining a silver-containing nanostructure having a spherical shape.

3. A method for producing a silver-containing nanostructure comprising: dispersing a polymeric compound (X) in which a hydrophilic segment (b) having a number average molecular weight within a range from 300 to 150,000 is bonded to a branched polyalkyleneimine chain (a) having a degree of branching within a range of (1 to 49)/100 when expressed as a molar ratio of (tertiary amine)/(total amines) and also having a number average molecular weight within a range from 1,000 to 150,000, in a medium;

adding silver oxide (Y) thereto;

adding at least one complexing agent selected from the group consisting of an amine of two or more valences, a thiol of two or more valences and an amine thiol compound, and a reducing agent (Z2), thereto; and carrying out a reduction reaction of the silver oxide (Y) at a temperature of 25 to 80° C., thereby obtaining a silver-containing nanostructure having a branched shape.

4. The method for producing a silver-containing nanostructure according to claim 1, wherein a hydrophobic segment (c) having a number average molecular weight within a range from 300 to 100,000 is further bonded to the branched polyalkyleneimine chain (a) within the polymeric compound (X).

5. The method for producing a silver-containing nanostructure according to claim 2,
wherein a hydrophobic segment (c) having a number average molecular weight within a range from 300 to 100,000 is further bonded to the branched polyalkyleneimine chain (a) within the polymeric compound (X).

6. The method for producing a silver-containing nanostructure according to claim 3,
wherein a hydrophobic segment (c) having a number average molecular weight within a range from 300 to 100,000 is further bonded to the branched polyalkyleneimine chain (a) within the polymeric compound (X).

7. The method for producing a silver-containing nanostructure according to claim 1,
wherein amounts of the polymeric compound (X) and the silver oxide (Y) used are such that a ratio of the silver oxide (Y) with respect to the combined total of the polymeric compound (X) and the silver oxide (Y) in terms of mass is at least 80% by mass.

8. The method for producing a silver-containing nanostructure according to claim 2,
wherein amounts of the polymeric compound (X) and the silver oxide (Y) used are such that a ratio of the silver oxide (Y) with respect to the combined total of the polymeric compound (X) and the silver oxide (Y) in terms of mass is at least 80% by mass.

9. The method for producing a silver-containing nanostructure according to claim 3,
wherein amounts of the polymeric compound (X) and the silver oxide (Y) used are such that a ratio of the silver oxide (Y) with respect to the combined total of the polymeric compound (X) and the silver oxide (Y) in terms of mass is at least 80% by mass.

10. The method for producing a silver-containing nanostructure according to claim 4,
wherein amounts of the polymeric compound (X) and the silver oxide (Y) used are such that a ratio of the silver oxide (Y) with respect to the combined total of the polymeric compound (X) and the silver oxide (Y) in terms of mass is at least 80% by mass.

11. The method for producing a silver-containing nanostructure according to claim 5,
wherein amounts of the polymeric compound (X) and the silver oxide (Y) used are such that a ratio of the silver oxide (Y) with respect to the combined total of the polymeric compound (X) and the silver oxide (Y) in terms of mass is at least 80% by mass.

12. The method for producing a silver-containing nanostructure according to claim 6,
wherein amounts of the polymeric compound (X) and the silver oxide (Y) used are such that a ratio of the silver oxide (Y) with respect to the combined total of the polymeric compound (X) and the silver oxide (Y) in terms of mass is at least 80% by mass.

* * * * *